(12) United States Patent
Naniyat et al.

(10) Patent No.: US 8,397,289 B2
(45) Date of Patent: Mar. 12, 2013

(54) METHOD FOR REMOVABLE ELEMENT AUTHENTICATION IN AN EMBEDDED SYSTEM

(75) Inventors: Arun Naniyat, Bangalore (IN);
Thenmozhi Arunan, Bangalore (IN)

(73) Assignee: Samsung Electronics Co., Ltd.,
Samsung-ro, Yeongton-gu, Suwon-si,
Gyeonggi-do (KR)

( * ) Notice: Subject to any disclaimer, the term of this patent is extended or adjusted under 35 U.S.C. 154(b) by 1098 days.

(21) Appl. No.: 12/151,470

(22) Filed: May 7, 2008

(65) Prior Publication Data

US 2009/0241186 A1 Sep. 24, 2009

(30) Foreign Application Priority Data

May 7, 2007 (IN) .............................. 964/CHE/2007
Nov. 23, 2007 (KR) ........................ 10-2007-0120441

(51) Int. Cl.
*G06F 21/00* (2006.01)
(52) U.S. Cl. ................................ 726/17; 726/4; 713/182
(58) Field of Classification Search .................. 726/4–7, 726/16–19, 21
See application file for complete search history.

(56) References Cited

U.S. PATENT DOCUMENTS

| | | | | |
|---|---|---|---|---|
| 5,544,083 A | * | 8/1996 | Iizuka et al. | .................. 708/131 |
| 7,028,191 B2 | | 4/2006 | Michener et al. | ............. 713/182 |
| 7,181,017 B1 | | 2/2007 | Nagel et al. | .................... 380/282 |
| 2002/0120857 A1 | | 8/2002 | Krishnan et al. | |
| 2004/0123113 A1 | | 6/2004 | Mathiassen et al. | |
| 2004/0230797 A1 | * | 11/2004 | Ofek et al. | ..................... 713/168 |
| 2006/0085630 A1 | * | 4/2006 | Challener et al. | ................. 713/2 |
| 2006/0129819 A1 | * | 6/2006 | Hirota et al. | .................. 713/172 |
| 2007/0011724 A1 | | 1/2007 | Gonzalez et al. | |
| 2007/0123305 A1 | | 5/2007 | Chen et al. | |

OTHER PUBLICATIONS

"What is algorithm?." Webopedia. Webopedia, n. d. Web. Mar. 27, 2012. <http://www.webopedia.com/TERM/A/algorithm.html>.*

* cited by examiner

*Primary Examiner* — Philip Chea
*Assistant Examiner* — Kendall Dolly
(74) *Attorney, Agent, or Firm* — Cha & Reiter, LLC

(57) ABSTRACT

The present invention proposes a method for protecting and monitoring removable entities in an embedded system. In accordance with the present invention, prior to insertion of a removable entity in the embedded system, a user registers details of the removable entity in the device host. The details may be entered after entering a password or a PIN. A registration identification is calculated based on an algorithm in the device host and is then stored in the host. After the removable entity is inserted, it is registered in an unalterable area (e.g. flash memory) of the device host. Information such as the category of the removable entity, a device number, etc. may be exchanged between the device host and the removable entity. The device host then computes a registration identification based on a Removable Entity Registration Algorithm. The identifications are then compared, and the device host displays the details of the removable entity to the user.

15 Claims, 3 Drawing Sheets

METHOD FOR REMOVABLE ELEMENT AUTHENTICATION IN AN EMBEDDED SYSTEM

CLAIM OF PRIORITY

This invention claims the benefit of the earlier filing date, pursuant to 35 USC 119, to that patent application entitled "Method for Removable Element Authentication in an Embedded System," filed in the Korean Patent Office on Nov. 23, 2007, and afforded serial number 120441/2007 and to that patent applicant entitled "Method for Removable Element Authentication in an Embedded System," filed in the Indian Patent Office on May 7, 2007 and afforded serial number 964/CHE/2007, the contents of which are incorporated by reference herein.

BACKGROUND OF THE INVENTION

1. Field of the Invention

The present invention relates to the field of authentication, and more particularly, the present invention relates to a method for removable element authentication in an embedded system.

2. Description of the Related Art

US Patent publication no. US20070123305 proposes a method for securing a Near Field Communication (NFC) device in a mobile phone. The method includes reading an international mobile subscriber identity (IMSI) of a subscriber identity module (SIM) card and an identity number of the NFC card of the mobile phone; detecting whether the IMSI number matches first data stored in memory of the mobile phone, detecting whether the identity number matches second data stored in the memory of the mobile phone; and enabling a sensing function of the NFC card when the IMSI number and the identity number respectively match the first and the second data in the memory of the mobile phone.

However, the application does not explicitly mention authentication of the SIM card for every interaction. Further, the application also does not mention anything about a removable entity other than a SIM card and an NFC card.

Another US Patent publication US20020120857 proposes a method for verifying integrity of a SIM Card after every power-up cycle. In this case, a first unique identifier for a SIM is stored within a wireless communication device (WCD) upon initial power-up of the WCD. A second unique identifier is received for a SIM coupled to the WCD upon supplying power to the SIM during a power management cycle. Access to the SIM is controlled based on the first unique identifier and the second unique identifier.

However, the application does not make mention of any removable entity other than a SIM card. Further, the application also does not mention applying the authenticity of the SIM card by using a short-range wireless technology. The application also does not explicitly mention the concept of authenticating the SIM card for every interaction.

SUMMARY OF THE INVENTION

In accordance with an aspect of the present invention, there is provided a method for removable element authentication in an embedded system including the steps of registering details of the removable entity in the device host prior to insertion of the removable entity in the embedded system, calculating a first registration ID based on an algorithm in the device host and storing the result of such a computation in the host, registering the first registration ID in an unalterable memory area of the device host after the removable entity is inserted, calculating a second registration ID based on a removable entity registration algorithm by the device host and displaying the details of the removable entity to the user by the host after comparing the first registration ID and the second registration ID, wherein, if the user wants to change the removable entity, the user de-registers the device through an appropriate host user interface configuration, then de-lists the removable device as non-secure and deletes the registration ID in the device host.

In accordance with another aspect of the present invention, there is provided a method for removable element authentication in an embedded system, wherein the interface between the removable entity and the device host is made operable, even during device power off, by using standby battery support.

In accordance with another aspect of the present invention, there is provided a method for removable element authentication in an embedded system, wherein the authenticity of the removable entity is checked constantly by the device host.

In accordance with another aspect of the present invention, there is provided a method for removable element authentication in an embedded system, wherein the registering details are entered after entering a password or a Personal Identification Number (PIN).

In accordance with another aspect of the present invention, there is provided a method for removable element authentication in an embedded system, wherein the device host reads the removable device details through a prescribed message sent from the device host to the removable entity.

In accordance with another aspect of the present invention, there is provided a method for removable element authentication in an embedded system, wherein the device host transmits the prescribed message into the removable entity and the removable entity transmits details of the removable entity having removable entity product manufacture number, removable entity type category, and a registration ID that is in the removable entity prestored by the vendor as a response to the prescribed message.

In accordance with another aspect of the present invention, there is provided a method for removable element authentication in an embedded system, wherein the generation of the second ID at the device host is using responses from the response to the prescribed message.

In accordance with another aspect of the present invention, there is provided a method for removable element authentication in an embedded system, wherein the usage of the second ID for device host is done through the Host_TEE_Interaction message, and by this message, the device is authenticated before every secure data transaction.

DETAIL DESCRIPTION OF THE INVENTION

Figure 1:
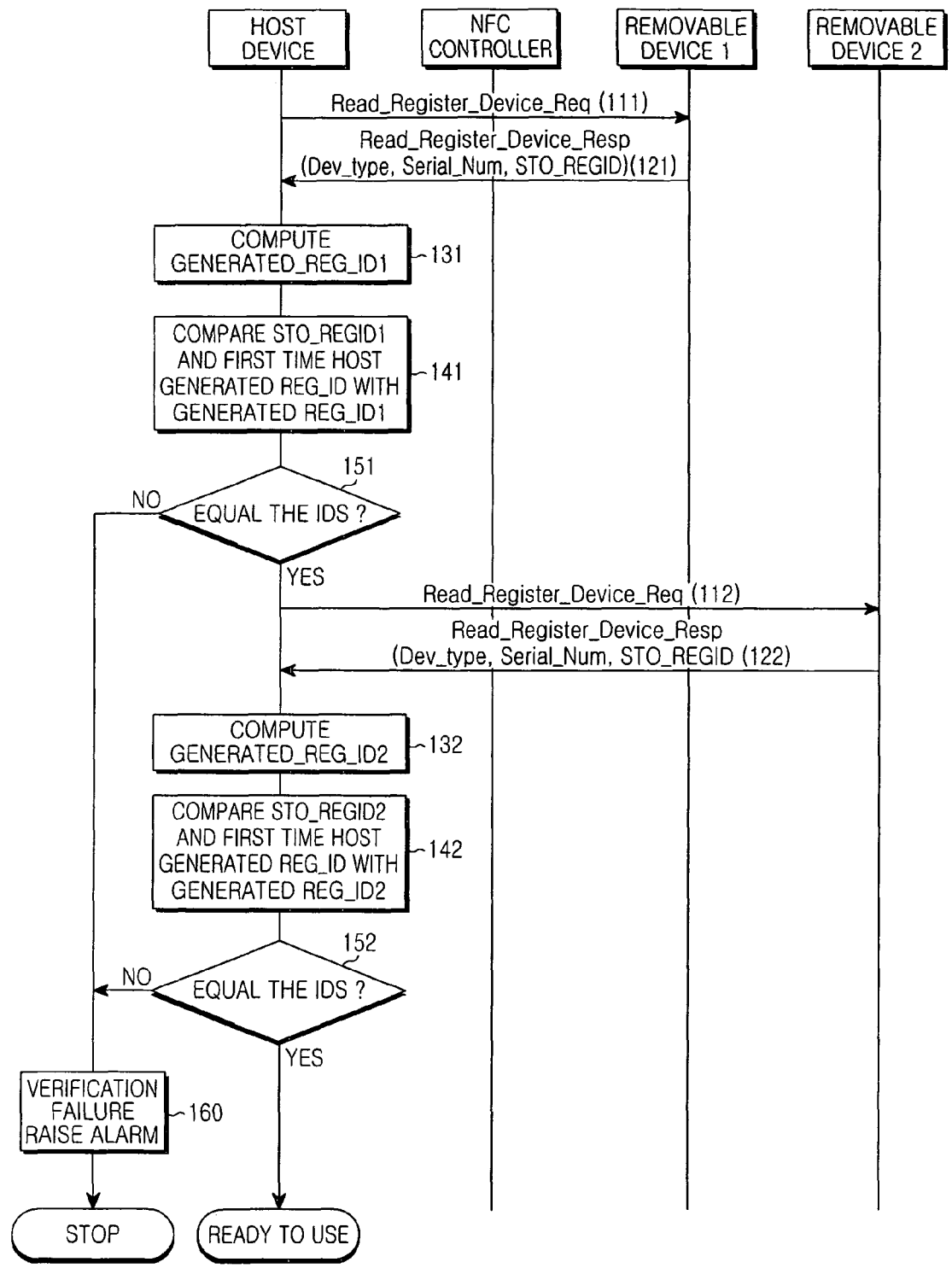
FIG. 1 is a flowchart illustrating an operation of the registration and authentication procedures where a removable entity is inserted into a portable device according to an exemplary embodiment of the present invention.

Exemplary embodiments of the present invention are described with reference to the accompanying drawings. In the following description, it will be readily understood by those skilled in the art that various modifications and changes can be made to the subject matter described herein and that such modifications and changes are within the technical spirit and scope of the present invention. It is also apparent that the modifications and changes fall within the scope of the present invention defined by the appended claims.

A method for authentication of a portable device according to the present invention includes four steps:

First, a user registers details of the removable entity in the device host. The details may be entered after entering a password or a PIN. A registration ID is calculated based on an algorithm in the device host and is then stored in the host.

Second, after the removable entity is inserted, it is registered in an unalterable area (e.g. flash memory) of the device host. Information such as the category of the removable entity, a device number, etc. may be exchanged/negotiated between the device host and the removable entity.

Third, a device host (or host device) then generates a registration ID based on a Removable Entity Registration Algorithm.

Fourth, the generated identifications are then compared to authenticate the user, and the device host displays the details of the removable entity to the user.

With regard to the first step, detailed information of a removable entity should be registered to a host device before a new removable entity is inserted into the portable device. That is, the credentials, e.g. Pre-authentication entry, of the removable entity are stored prior to authentication (pre-stored).

Specifically, in the first step, a user identifies the detailed information, and inputs the detailed information to the device host through an interface of the portable device. At this time, the detailed information may be obtained from a reliable source like the vendor of the removable entity or the service provider that supports the application. For example, the detailed information may be included in a manual, or the like, supplied in provision, e.g. sale, of the removable entity or the application.

That is, the detailed information may be a removable entity product manufacture number, a removable entity type category, and a secret key used for computing a registration ID. The removable entity product manufacture number may include a Subscriber Identification Module (SIM), an International Mobile Equipment Identity (IMEI), or a product manufacture serial number. Further, the removable entity type category is information instructing a type of the removable entity, such as Secure Digital Input/Output (SDIO) card, a Multi-Media Card (MMC), or the like. Furthermore, the secret key is supplied to the user either with the removable entity in its packaging or sent through a secure means such as Short Message Service (SMS). The secret key could be of variable bit size, like 16, 24, 48-bits and can be either numeric or alphanumeric type.

The device host generates host registration information including the detailed information received through the described process, and stores the generated host registration information to a secured area in memory of the device host. It is preferred that the host registration information is generated based on a secure algorithm.

Further, it is preferred that the device host authenticates the access of the portable device before the detailed information of the removable entity is supplied to the device host through the interface in the portable device. That is, the device host requests the transmission of password or a Personal Identification Number (PIN) to the portable device prior to receiving the detailed information of the removable entity. Then, the device host identifies if a response to the request is valid, and authenticates the access of the interface for inputting the detailed information.

Next, step 2 is a step of registration negotiation.

When a new removable entity is inserted into the portable device by the user, it is immediately sensed by a removable entity slot.

FIG. 1 is a flowchart illustrating an operation of the registration and authentication procedures where a removable entity is inserted into a portable device according to an exemplary embodiment of the present invention. Referring to FIG. 1, the device host sends the message "Read_Register_Device_Req" (111) to the removable entity for registration and authentication purpose. Then, the removable entity sends the message "Read_Register_Device_Resp" (121) as a response to the message "Read_Register_Device_Req" (111) to the device host. The message "Read_Register_Device_Resp" (121) sent by the removable entity includes the removable entity type category (Dev_type), the removable entity product manufacture process serial number (Serial_Num), and the registration ID (STO_REG ID) stored by the vendor in the removable entity.

The removable entity type category could be an MMC card, an SD card, a SIM card, etc. The removable entity product manufacture process serial number could be its IMEI number for a SIM or be its product manufacture serial number, etc., for other removable entity.

Step 3 is a step of generating registration information of the removable entity 131. In step 131, the registration information of the removable entity, e.g. Generated_Reg_ID, is generated by applying the device type category, the removable entity product manufacture process serial number, the secret key, etc., to a secure algorithm.

The secret key for computing the registration information of the removable entity, e.g. Generated_Reg_ID, is extracted from a secure registry location of an embedded system.

After step 131, the device host compares the values of the registration information of the removable entity, e.g. Generated_Reg_ID, the registration ID (STO_REG ID) in the removable entity, and the host registration information, e.g. a First time Host Generated Reg_ID 141.

If the registration information of the removable entity, e.g. Generated_Reg_ID, the registration ID (STO_REG ID) in the removable entity, and the host registration information, e.g. a First time Host Generated Reg_ID all match (151-YES), the authentication is successfully accomplished. Also, various applications in the device host can use the removable entity.

However, if there is a mismatch between the registration information of the removable entity, e.g. Generated_Reg_ID, the registration ID (STO_REG ID) in the removable entity, and the host registration information, e.g. a First time Host Generated Reg_ID (151-NO), the authentication process has failed, and a security warning message for informing the failure is flashed to the user (160). In the un-authenticated state, the device host cannot access the removable entity and the application in the device host cannot use the removable entity.

Further, in the portable device having a plurality of removable entities, step 2 and step 3 can be repeatedly performed (although not shown). That is, steps 112, 122, 132, 142, and 152 shown in FIG. 1 are performed by an algorithm identical to that of the described steps 111, 121, 131, 141, and 151.

In the meantime, step 4 is a step for authenticating the user. That is, after the registration information (the registration information of the removable entity, e.g. Generated_Reg_ID, the registration ID (STO_REG ID) in the removable entity, and the host registration information, e.g. a First time Host Generated Reg_ID) are authenticated by the device host, the device host provides the user with the detailed information of the removable entity together with an authentication success message. For example, the authentication success message is converted into characters recognizable by the user, and the converted characters are displayed on a display in the portable device. Therefore, the user can understand that there is a match between the host registration information generated in step 1 and the registration information of the removable entity computed in step 3.

Further, NFC based on the devices can use the removable entity that holds NFC application and serves NFC host. A lower end of the removable entity will be interfaced with an NFC controller. In such an NFC Host—Controller environment, the Device Registration ID is always used for data exchange, so that the removable device is authenticated through high security.

Figure 2:
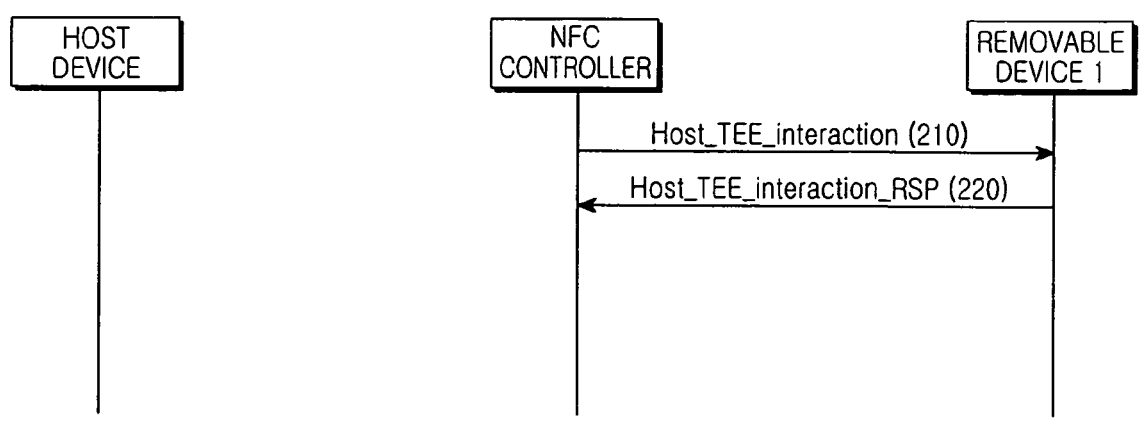
FIG. 2 is a flowchart illustrating a process of exchanging a command used for a method for authenticating a portable device according to an exemplary embodiment of the present invention.

FIG. 2 is a flowchart illustrating a process of exchanging a command used for a method for authenticating a portable device according to an exemplary embodiment of the present invention. Referring to FIG. 2, as described in the NFC Host—Controller environment above, the NFC controller sends a sample message Host_TEE_Interaction (210) to the removable entity. Then, the removable entity sends back the message, Host_TEE_Interaction_RSP (220), as a response of the message, Host_TEE_Interaction (210) to the NFC controller. The Host_TEE_Interaction message (210) includes the Generated_Reg_ID and parameters, and the Host_TEE_Interaction_RSP message (220) includes the STO_REG ID and parameters.

When the user wants to cancel of registration or change the removable entity, for example when the SIM for correcting the identification number of the portable device, the SDIO or the MMC card for the larger capacity memory is changed, the user should cancel the registration of the portable device, delete a list of the portable device which is unsecured from the memory in the device host, and delete the device type category, the device number, the secret key, and the registration ID. To this end, the device host provides the interface through which the registration of the portable device can be canceled, and the list of the portable device, the device type category, the device number, the secret key, and the registration ID can be deleted.

Further, in order to track the portable device, the interface between the portable device and the device host is operated through a standby battery, even when power is not supplied to the portable device.

Figure 3:
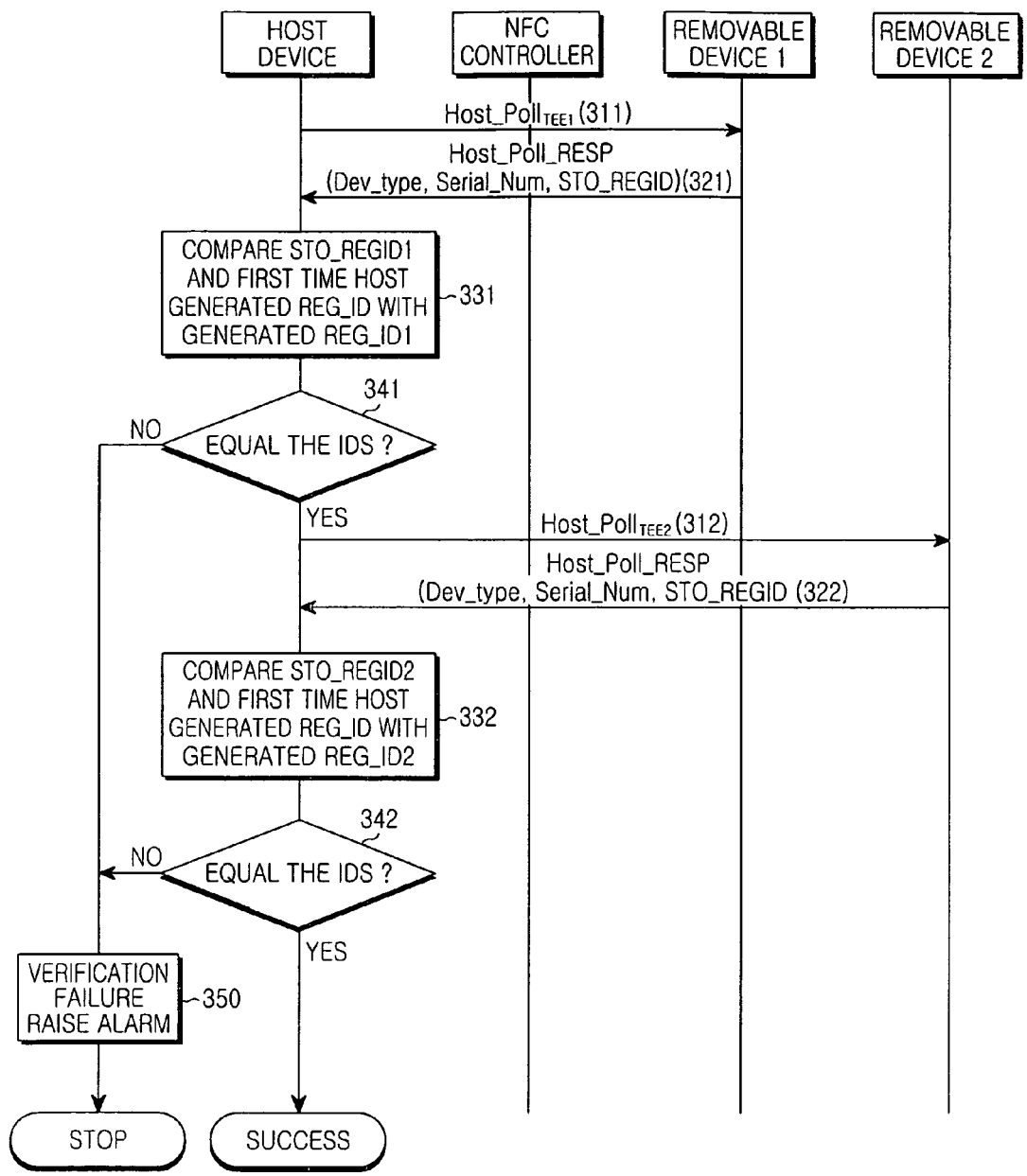
FIG. 3 is a flowchart illustrating a process of authentication between a removable entity and a device host during when power is not supplied to a portable device according to a method for authenticating a portable device according to an exemplary embodiment of the present invention.

FIG. 3 is a flowchart illustrating a process of authentication between a removable entity and a device host when power is not supplied to a portable device according to a method for authenticating a portable device according to an exemplary embodiment of the present invention. Referring to FIG. 3, when the portable device is switched into a state where power is not supplied, the detailed information for a newly changed removable entity can be provided to the device host through the interface using a standby battery.

That is, the device host sends a request message, e.g. Host_POll$_{TEE1}$ message (311), to the removable entity, and the newly changed removable entity sends the response message, e.g. Host_Poll_Resp (321) message in FIG. 3, which includes the removable entity type category (Dev_type), the removable entity product manufacture process serial number (Serial_Num), and the registration ID (STO_REG ID) stored by the vendor in the removable entity, as a response of the request message, e.g. Host_POll$_{TEE1}$ message (311), to the host device. The detailed information, e.g. STO_REG ID, for the exchange of the removable entity, provided to the device host can be collected in the readable/writable memory area in the device host prepared to authenticate the removable entity.

Next, the host device compares the registration information, e.g. a first registration ID, of the removable entity stored in the memory and the registration ID, e.g. STO_REG ID, collected in the removable entity with the host registration information, e.g. first time Host Generated Reg_ID (see block 131, FIG. 1).

For example, if the registration ID, e.g. STO_REG ID, in the newly inserted removable entity matches the host registration information, e.g. a First time Host Generated Reg_ID, previously stored in the device host (341-YES), the authentication of the newly inserted removable entity is successfully accomplished. When the authentication of the newly inserted removable entity is successfully accomplished, the device host permits the access to the new entity.

However, if there is a mismatch between the registration ID, e.g. STO_REG ID, in the newly inserted removable entity and the host registration information, e.g. a First time Host Generated Reg_ID (341-NO), previously stored in the device host, the authentication of the newly inserted removable entity has failed. In the un-authenticated state, the device host does not permit access to the new removable entity and sends a command for displaying the information corresponding to the authentication failure 350.

The information corresponding to the authentication failure can be transferred to the portable device according to the re-start of the portable device, and/or the transferred information is displayed on the display of the portable device.

Further, in the portable device having a plurality of removable entities, steps 312, 322, 333, and 342 shown in FIG. 3 can be performed repeatedly (not shown) by an algorithm identical to that of the steps 311, 321, 331, and 341.

As described above, the present invention can provide a solution to avoid the situation where the data is leaked out by a newly inserted malicious removable entity when the embedded system is off, and improve the reliability of the data security of the removable elements.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. For example, the device host may be a portable telecommunication device, e.g., a cell phone, that includes a slot that accepts a removable entity. The slot includes an interface that enables a processor to communicate with the removable entity.

As described above, the input method, the configuration of the apparatus, and its action in the mobile communication terminal having the touch screen can be implemented according to the exemplary embodiment of the present invention.

Similarly, it would be recognized that the algorithms referred to herein may be any one of a number of well-known security algorithm for determining an identification and details of such algorithms need not be presented in detail herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for removable element authentication in an embedded system comprising the steps of:
   receiving, by a device host, a first removable entity product manufacture number, a first removable entity type category and a first secret key previously stored in the embedded system prior to insertion of a removable entity into the embedded system;
   calculating, by the device host, a first registration identification by-applying the first removable entity product manufacture number, the first removable entity type category and the first secret key to a secure algorithm stored in the device host and storing the result of the calculation in the device host;
   receiving, by the device host, a second removable entity product manufacture number, a second removable entity type category and a third registration identification stored in the removable entity after the removable entity is inserted into the embedded system;
   calculating, by the device host, a second registration identification by-applying the second removable entity product manufacture number, the second removable entity type category and the first secret key to the secure the algorithm;
   comparing the first registration identification, the second registration identification and the third registration identification with each other; and
   displaying details of the removable entity to a user by the device if the first registration identification, the second registration identification and the third registration identification are identical to each other;
   wherein when the embedded system is powered off, a device host user interface of the embedded system remains active and a device authentication of the removable entity is performed upon insertion of the removable entity into the embedded system regardless of a power status of the embedded system via a battery backup of the device host user interface.

2. A method as claimed in claim 1, wherein the interface between the removable entity and the device host is made operable, even during device power off, by using standby battery support.

3. A method as claimed in claim 1, wherein an authenticity of the removable entity is checked constantly by the device host.

4. A method as claimed in claim 1, wherein registering details are registered in the device host after entering a password or a Personal Identification Number(PIN).

5. A method as claimed in claim 1, wherein the device host reads the second removable entity product manufacture number, the second removable entity type category and the third registration identification through a prescribed message sent from the device host to the removable entity.

6. A method as claimed in claim 1, wherein the usage of the second registration identification by the device host is performed through a Host_TEE_Interaction message, and by this message, the device is authenticated before every secure data transaction.

7. A device for removable entity authentication in an embedded system, comprising:
   a slot for receiving said removable entity;
   an input/output device for receiving/output desired data items;
   a processor in communication with said slot, said input/output device and a memory, the memory contain code which when accessed by the processor causing the processor to:
   receive a first removable entity product manufacture number, a first removable entity type category and a first secret key previously stored in the embedded system prior to insertion of the removable entity into the embedded system;
   calculate a first registration identification by applying the first removable entity product manufacture number, the first removable entity type category and the first secret key to a secure algorithm;
   receive a second removable entity product manufacture number, a second removable entity type category and a third registration identification stored in the removable entity after the removable entity is inserted into the embedded system;
   calculate a second registration identification by applying the second removable entity product manufacture number, the second removable entity type category and the first secret key to the secure the algorithm;
   compare the first registration identification, the second registration identification and the third registration identification with each other; and
   display details of the removable entity to a user if the first registration identification, the second registration identification and the third registration identification are identical to each other:
   wherein when the embedded system is powered off, a device host user interface of the embedded system remains active and a device authentication of the removable entity is performed upon insertion of the removable entity into the embedded system regardless of a power status of the embedded system via a battery backup of the device host user interface.

8. The device as claimed in claim 7, further comprising:
   a standby battery, wherein an interface in said slot between the removable entity and the processor is operable, even during device power off, by using said standby battery.

9. The device as claimed in claim 7, wherein said processor further:
   continually checking an authenticity of the removable entity.

10. The device as claimed in claim 7, wherein the first removable entity product manufacture number, the first removable entity type category and the first secret key are registered after entering a password or a Personal Identification Number(PIN).

11. The device as claimed in claim 7, wherein the processor reads the second removable entity product manufacture number, the second removable entity type category and the third registration identification through a prescribed message sent from the processor to the removable entity.

12. The device as claimed in claim 7, wherein the usage of the second registration identification by the processor is done through a Host_TEE_Interaction message, and by this message, the device is authenticated before every secure data transaction.

13. The device as claimed in claim 7, the processor, in response to removal of said removable entity, executing code for:
- de-registering the removable entity;
- de-listing the removable entity as non-secure; and
- deleting the first registration identification.

14. A method as claimed in claim 1, wherein a secret key is extracted from a secure registry location of the embedded system and is also supplied with the removable entity or sent to a user via Short Message Service (SMS).

15. A device as claimed in claim 7, wherein a secret key is extracted from a secure registry location of the embedded system and is also supplied with the removable entity or sent to a user via Short Message Service (SMS).

* * * * *